T. McGEE.
RAILWAY ROAD BED DISKING MACHINE.
APPLICATION FILED DEC. 17, 1914.
1,158,701.
Patented Nov. 2, 1915.
2 SHEETS—SHEET 1.
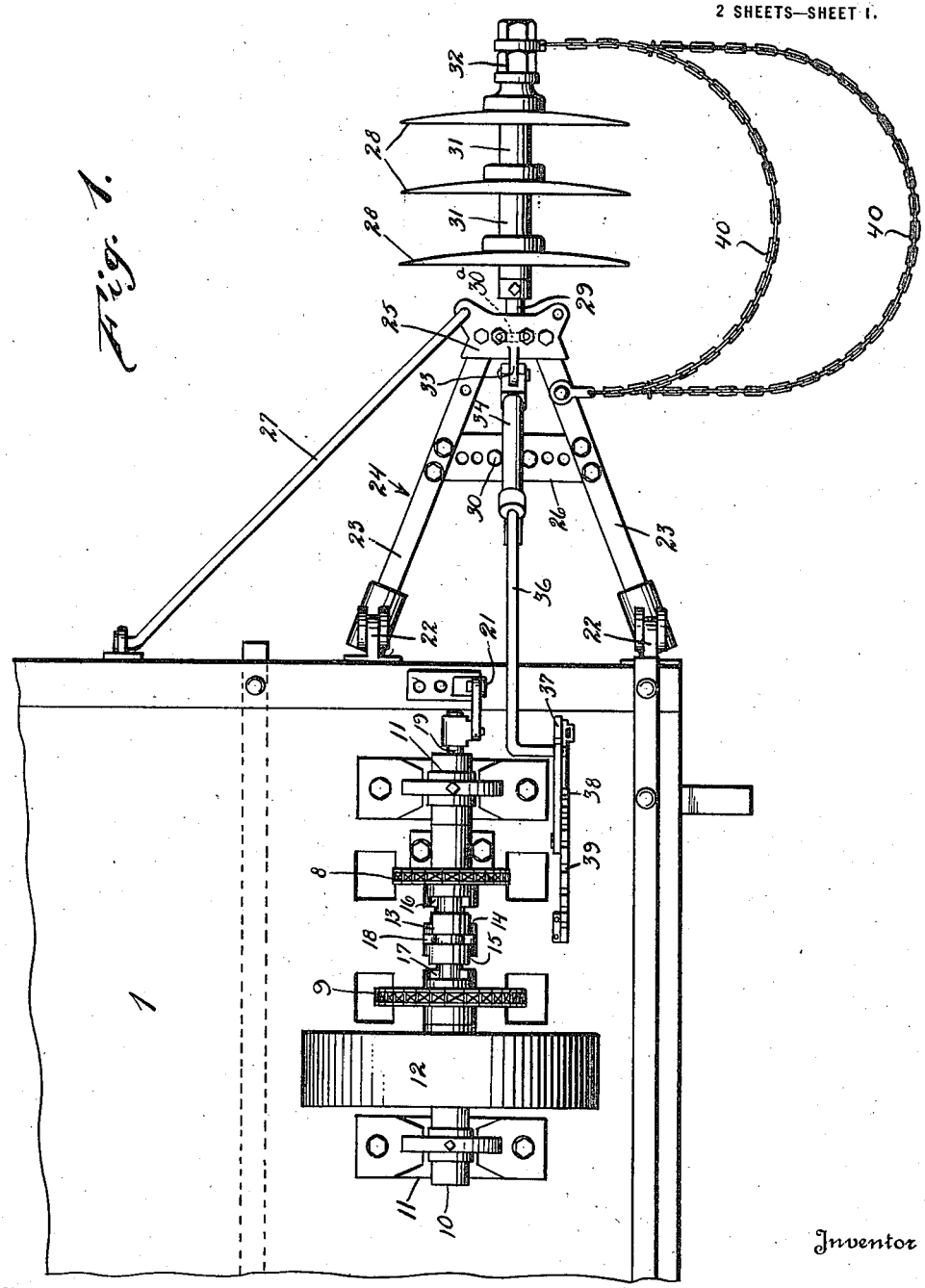

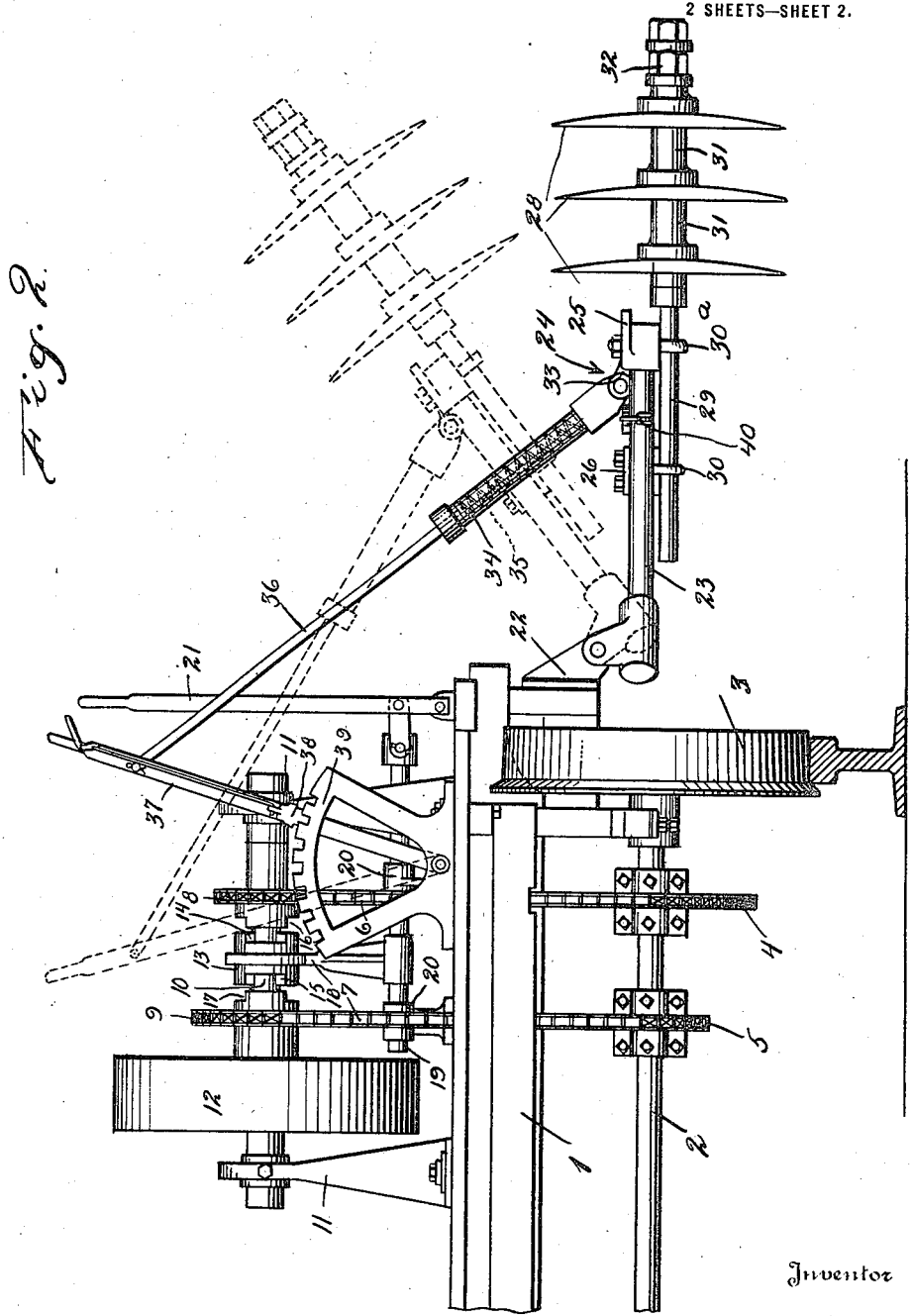

UNITED STATES PATENT OFFICE.

THOMAS McGEE, OF MADISON, SOUTH DAKOTA.

RAILWAY-ROAD-BED-DISKING MACHINE.

1,158,701.   Specification of Letters Patent.   Patented Nov. 2, 1915.

Application filed December 17, 1914. Serial No. 877,784.

*To all whom it may concern:*

Be it known that I, THOMAS McGEE, a citizen of the United States, residing at Madison, in the county of Lake and State of South Dakota, have invented certain new and useful Improvements in Railway-Road-Bed-Disking Machines, of which the following is a specification.

This invention relates to railroad devices, particularly to devices for operating upon the road bed, and has for its object the provision of a device adapted to be propelled upon the tracks and provided with cutter wheels engaging the earth at the sides of the road bed for breaking up clods and lumps of earth, tearing out the roots of weeds and grass and smoothing the surface, the cutter wheels being adjustably supported whereby they may be held at different angles for acting upon embankments having varying inclines, at a different pitch and at varying distances from the track.

An important object is the provision of a device of this character which will be comparatively simple and inexpensive in manufacture, efficient and durable in service, rapid and positive in action and a general improvement of the art.

With these and other objects and advantages in view, the invention consists in the novel construction and arrangement of parts to be hereinafter more fully described and claimed, and illustrated in the accompanying drawings, in which:

Figure 1 is a plan view of the device, one side being omitted, and Fig. 2 is an end elevation thereof.

Referring more particularly to the drawings, the numeral 1 designates a frame mounted on axles 2 carrying wheels 3. One axle 2 has secured thereon large and small sprockets 4 and 5 about which are trained chains 6 and 7 which extend upwardly and around other small and large sprockets 8 and 9 loosely mounted on a counter-shaft 10 journaled in bearings 11 on the frame 1. The device is propelled by a belt driven by any suitable power such as a gas engine, not shown, and trained about a pulley 12 on the shaft 10.

In order that the device may be driven at selected speeds a sleeve 13 is provided on the shaft 10. The sleeve 13 has two clutch faces 14 and 15 formed thereon adapted to be engaged with similar clutch faces 16 and 17 formed on the hubs of the sprockets 8 and 9, respectively. The sleeve 13 is grooved for the reception of a fork 18 carried by a rod 19 slidable through bearings 20 and moved by means of a pivoted lever 21 connected with the rod 19. When the lever 21 is shifted to engage the clutch faces 14 and 16, the device will be driven at a low speed, and when the lever 21 is shifted to engage the clutch faces 15 and 17 the device will be driven at a higher speed.

Secured on the side of the frame 1 is a pair of brackets 22 to which are pivotally connected the arms 23 of a substantially triangular frame 24. The arms 23 are connected at their ends by plate 25 and intermediate their ends by another plate 26. This triangular frame is held in position by a brace rod 27 secured to the plate 25 and pivotally connected with the side of the frame 1.

The cutting mechanism comprises a plurality of disks 28 revoluble upon shaft 29 held below the frame 24 by U bolts 30 and 30$^a$, the U bolt 30 passing through selected ones of a plurality of holes in the plate 26, and the U bolt 30$^a$ passing through the plate 25. By this construction it will be apparent that after loosening the U bolts the shaft 29 may be moved inwardly or outwardly to cut close to or farther from the tracks. By placing the U bolt 30 in a different pair of holes in the plate 26 the shaft 29 may be swung to hold the disks at a different angle or pitch. The disks are spaced apart by their hubs 31 and are prevented from displacement by nut 32. The plate 25 has an ear 33 formed thereon to which is pivotally secured a tube 34 containing a spring 35 to take up the thrust of the disks. Within the tube 34 is disposed the end of rod 36 which is pivotally connected with a lever 37 pivoted on the frame 1. The lever 37 is provided with a spring catch 38 engaging a segmental rack 39.

When cutting at the side of a track, the device is run preferably at low speed, as previously described, and the lever 37 is moved so that the disks 28 will engage and cut into the ground, tearing roots and cutting and breaking the ground. For working upon embankments or in cuts, the lever 37 may be shifted to change the position of the disks so that they will closely follow the inclined surfaces. The disks may be thrown out of operation by moving the lever 37 inwardly, whereupon the disks will be elevated out of engagement with the ground, as shown by dotted lines in Fig. 2. The width of the surface cut may be varied by moving the rod 29 in or out to the desired extent.

In order that the ground cut and broken up may be leveled, I provide chains 40 having their ends connected with the outer end of the shaft 29 and with the plate 25 and so disposed as to trail as loops behind the disks.

From the foregoing description and a study of the drawings it will be apparent that I have thus provided a simple railroad device for cutting and leveling the ground at the sides of the road bed which is easily and readily thrown into or out of operation and which is adjustable to various inclined surfaces, and is adaptable to being secured to either or both sides of the frame 1.

Having thus described my invention what I claim is:

1. The combination with a wheeled frame adapted to travel on a railroad track, of a pivoted vertically swingable support extending laterally from the side of said frame, a shaft angularly adjustable horizontally and longitudinally thereon, a plurality of ground engaging disks carried by said shaft, and means for vertically adjusting the angular position of said support, said means comprising a link connected with said support, and a lever pivoted upon said frame and connected with said link, said link comprising a tubular portion and a rod telescoping into said tubular portion.

2. A device of the character described comprising a wheeled frame adapted to travel upon a railroad track, a support pivoted upon the side of said frame, a shaft carried by the support, a plurality of disks on said shaft, means for adjusting said support and shaft in a vertical plane in relation to said frame, comprising a lever pivoted on said frame and provided with a releasable spring catch, a segmental rack engaged by said catch and a link pivotally connected with said support and said lever, and means for adjusting said shaft longitudinally and angularly laterally with relation to said support comprising a plurality of U-shaped clamping members holding said shaft to said support.

3. A device of the character described comprising a wheeled frame, a support pivotally mounted on the side thereof, a protractile and retractile shaft mounted on said support, said shaft being both angularly adjustably and longitudinally adjustably clamped thereon, a plurality of ground engaging disks on said shaft, means for raising and lowering said support, said means comprising a link and lever connection with said frame, said link comprising a tubular portion, a spring in said tubular portion, and a rod telescoping into said tubular portion and abutting said spring for absorbing the thrust of said disks.

4. A device of the character described comprising a wheeled frame adapted to travel on a railroad track, a support pivoted on the side of said frame, said support being angularly vertically adjustable, a shaft mounted for angularly lateral and longitudinally adjustment on said support, a plurality of disks on said shaft, and means for absorbing the thrust of said disks.

In testimony whereof I hereto affix my signature in the presence of two witnesses.

THOMAS McGEE.

Witnesses:
Geo. R. Faunce,
J. F. Blewett.